(12) United States Patent
Bosso et al.

(10) Patent No.: US 6,243,505 B1
(45) Date of Patent: Jun. 5, 2001

(54) NARROW-BAND OPTICAL MODULATOR WITH REDUCED POWER REQUIREMENT

(75) Inventors: Sergio Bosso, Buccinasco; Emilio Casaccia, Turin; Gianluca Gobetti, Castelvetro Piacentino, all of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/505,880

(22) Filed: Feb. 17, 2000

Related U.S. Application Data

(63) Continuation of application No. PCT/EP98/04854, filed on Aug. 4, 1998.
(60) Provisional application No. 60/056,663, filed on Aug. 22, 1997.

(30) Foreign Application Priority Data

Aug. 18, 1997 (EP) .................................. 97114174

(51) Int. Cl.[7] ..................................... G02F 1/035
(52) U.S. Cl. .................. 385/2; 385/3; 385/8; 385/40
(58) Field of Search .................. 385/1–4, 8–9, 385/14, 40; 359/181, 182, 183, 245, 254

(56) References Cited

U.S. PATENT DOCUMENTS

| | | | |
|---|---|---|---|
| 4,372,643 | 2/1983 | Liu et al. | 385/2 |
| 4,560,246 | 12/1985 | Cotter | 385/24 |
| 4,850,667 | 7/1989 | Djupsjöbacka | 385/2 |
| 5,408,544 | * 4/1995 | Seino | 385/3 |
| 5,455,876 | * 10/1995 | Hopfer et al. | 385/2 |
| 5,502,780 | 3/1996 | Madabhushi | 385/2 |
| 5,563,965 | * 10/1996 | Madabhushi | 385/2 |
| 5,787,211 | * 7/1998 | Gopalakrishnan | 385/2 |
| 5,854,862 | * 12/1998 | Skeie | 385/2 |

FOREIGN PATENT DOCUMENTS 696842   1/1982   (RU) .

OTHER PUBLICATIONS

R.C. Alferness et al., "Titanium Diffused Lithium Niobate Waveguide Devices", Guided–Wave Optoelectronics, T. Tamir (Ed.), Springer–Verlag, pp. 144–163, (1988).
M.M. Howerton et al., "SBS Suppression Using a Depolarized Source for High Power Fiber Applications", Journal of Lightwave Technology, vol. 14, No. 3, pp. 417–422, (1966).
G.K. Gopalakrishnan et al., "Performance and Modeling of Resonantly Enhanced $LiNbO_3$ Modulators for Low–Loss Analog Fiber–Optic Links", IEEE Transactions on Microwave Theory and Techniques, vol. 42, No. 12, pp. 2650–2656, (1994).
G.K. Gopalakrishnan et al., "Resonant Enhancement of a $LiNbO_3$ Traveling–Wave Modulator for Low–Loss Analog Fiber–Optic Links", IEEE MTT–S International Microwave Symposium Digest, vol. 1, pp. 159–162, (1994).

* cited by examiner

*Primary Examiner*—Hemang Sanghavi
(74) *Attorney, Agent, or Firm*—Finnegan, Henderson, Farabow, Garrett & Dunner, L.L.P.

(57) ABSTRACT

An optical modulator includes an optical waveguide and an electrode structure coupled to the waveguide such that a modulating signal applied to the electrode structure varies the refractive index of the waveguide so as to produce a modulated optical output signal. The electrode is fabricated in the form of a transmission line terminated in a short circuit. The ratio of the wavelength of the modulating signal to the effective length of the electrode is comprised between 2.1 and 4.0, and is preferably of approximately 2.7. The modulator can be constructed to provide either phase or amplitude modulation. An optical transmission method having SBS suppression and an optical modulator system are further provided.

11 Claims, 14 Drawing Sheets

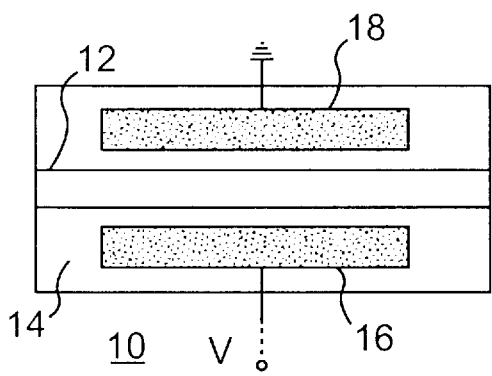
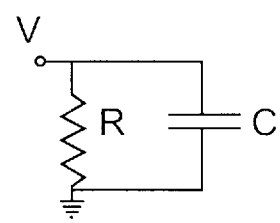
FIG. 1A  FIG. 1B
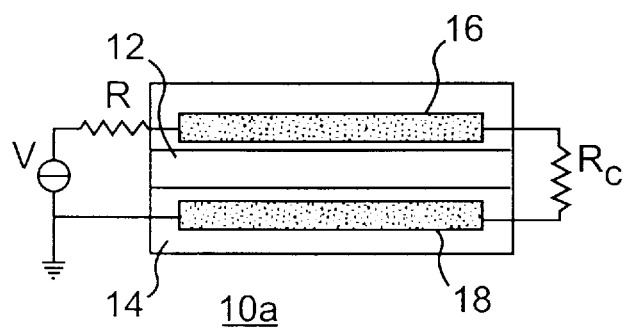
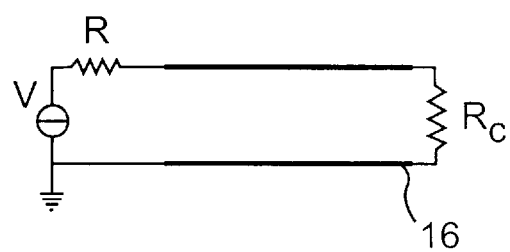
FIG. 2A  FIG. 2B

NARROW-BAND OPTICAL MODULATOR WITH REDUCED POWER REQUIREMENT

This application is a continuation of International Application Ser. No. PCT/EP98/04854, filed Aug. 4, 1998, the content of which is incorporated hereby by reference and claims the benefit of U.S. Provisional Application Ser. No. 60/056,663, filed Aug. 22, 1997.

BACKGROUND OF THE INVENTION

1. Field of the Invention

The Invention relates to optical modulators and, more particularly, to optical modulators having optimized electro-optical interaction to permit reduced power requirements.

2. Description of the Related Art

Traditional cable TV systems (often referred to as "CATV systems") used coaxial cable to provide up to about eighty channels of broadcast video signals. Recently, however, consumers are demanding more channels and additional services, such as high-definition television. In order to provide the increased signal capacity required by these demands, CATV systems have begun to employ fiber optical cables which carry signals as beams of light.

One drawback of optical fiber transmission systems, both analog and digital, is that the fiber optical cables are subject to a phenomenon known as "Stimulated Brillouin Scattering" (SBS). This is a nonlinear effect that occurs when the optical power at the fiber entrance exceeds a given threshold (typically about 6 dBm for a narrow bandwidth source having a spectral bandwidth of less than 20 MHz), thus producing an intense optical field which generates an acoustic wave in the fiber. The acoustic wave acts as a dynamic diffraction grating, generating a reflected wave that takes power away from the optical signal field. This phenomenon is discussed in U.S. Pat. No. 4,560,246.

One technique for suppressing Brillouin scattering, both in analog and digital systems, consists in phase modulating the optical signal field. The phase modulation has no influence on the detection process at the receiver, but it induces a broadening of the spectrum of the signal transmitted in the fiber beyond the coherence band of Brillouin scattering.

For the phase modulation to produce a good suppression of Brillouin scattering, the modulation frequency must be sufficiently high and the phase deviation be above $2\pi$.

The power necessary to obtain such a phase modulation is generally high (greater than 5W at a phase modulation frequency of 2 GHz). This limits the applications in which the phase modulation technique can be used. For example, an increase in the power leads to heat generation inside the electrodes fabricated on the lithium niobate substrate typically used in designing the modulators. This material has a low thermal conductivity, and thus heat generated in the material tends to build up, causing an increase in the operating temperature and thus reducing reliability.

An optical phase modulator of lithium niobate ($LiNbO_3$) is typically obtained by utilizing the electro-optical effect of the material. This effect consists in modifying, through an applied electric field, the index of refraction of the optical guide in which the optical signal is propagated. The variation in time of the refractive index produces the desired phase modulation of the optical field.

To obtain a phase modulator, it is necessary to have an optical waveguide and an electrode structure that permits the generation of the electric field necessary for the modulation. Optical waveguides in the $LiNbO_3$ crystal are generally formed by titanium diffusion or by proton exchange.

Lumped and traveling wave electrode structures are known. Examples of the two types of electrode structures for optical modulators 10 and 10a are shown in FIGS. 1A and 2A. Each modulator includes an optical waveguide 12 formed in a substrate 14. A pair of electrodes 16, 18 are formed on the surface of substrate 14 on opposite sides of waveguide. The two configurations differ essentially in the electrical termination. The basic characteristics and operating parameters of such configurations are well known in the prior art. A general reference is, for example, chapter 4 by R. C. Alferness "Titanium Diffused Lithium Niobate Waveguide Devices", in a book entitled "Guided-Wave Optoelectronics" (Ed. T. Tamir) published in 1988, Springer Verlag.

Lumped electrodes are shown in FIG. 1A. Electrode 16 is connected to a source, or driver, of a modulating signal V and electrode 18 is connected to ground. A lumped electrode type of modulator functions best at low frequencies. In fact, from the electrical standpoint, the lumped electrode structure behaves essentially as a concentrated capacitor C that, together with the internal resistance R of the driver and of the electrodes, constitutes a low-pass RC filter, as shown in FIG. 1B.

The traveling-wave type of electrode structure overcomes this limitation. Electrodes 16 and 18 of this structure, shown in FIG. 2A, constitute a transmission line terminated in its characteristic impedance $R_c$, that is, a matched line. The equivalent electric circuit is shown in FIG. 2B. The electrooptical response of the traveling-wave type of modulator is also of the low-pass type, but the cut-off frequency is determined by the difference in velocity between the wave of the optical signal and the wave of the modulating electric field. This velocity difference can be made quite small and thus these modulators generally have a higher cutoff frequency.

Both types of modulators have an electrooptical response of the low-pass type.

U.S. Pat. No. 4,372,643 (Liu et al.) discloses an ultrafast gate produced by locally modulating the coupling along a pair of coupled wavepaths by means of a standing-wave electrical signal. The electrodes form an electrical transmission line that is energized at its input by means of a signal source having an output impedance R. In one embodiment, the transmission line is terminated by means of a short circuit and the electrodes are proportioned such that the input impedance of the line has a real part that is equal to R. When energized, a standing wave is produced along the length of the electrodes which locally affects the coupling between the optical waveguides. Alternatively, the electrodes can be terminated by means of an open circuit.

U.S. Pat. No. 4,850,667 (Djupsjöbacka) relates to an electrode arrangement for optoelectronic devices. A first elongate electrode has a connecting conductor for an incoming microwave signal with the aid of which a light wave is to be modulated. The connecting conductor divides the first electrode into a standing wave guide and a traveling wave guide, which is connected via a resistor to a U-shaped second electrode. It is stated in the patent that the incoming modulating microwave has maximum modulating ability in the standing waveguide if its frequency is in agreement with the resonance frequency $f_c$ of the standing wave guide.

In an embodiment, the standing wave guide is connected at one end with the U-shaped second electrode at its closed end. The standing waveguide has in this embodiment a resonance frequency $f_c=c/(4 \cdot L \cdot n\mu)$, where c is the speed of light in vacuum, L is the length of the standing wave guide and $n\mu$ is the refractive index for the microwave guides.

SU patent 696842 discloses electro-optical ultra-high-frequency light modulators based on a bulk electro-optical crystal. Two coaxial resonators are coupled to the ends of two electrodes applied on opposite faces of the electro-optical crystal. Modulator efficiency and modulation depth are increased by short-circuiting opposite ends of the electrodes. The electrical length of the coaxial resonators and of the electrodes is respectively equal to one quarter wavelength and half wavelength of the center frequency of the modulator's working range. The coaxial resonators can be replaced by microstrip resonators.

A paper by G. K. Gopalakrishnan et al., IEEE Transactions on Microwave Theory and Techniques, Vol. 42, No. 12, Dec. 1994, pag. 2650–2656, discloses the performance and modeling of resonantly enhanced $LiNbO_3$ traveling wave optical modulators. A resonant enhancement technique involving external line stretching of a length of the nonactive section of the modulator is proposed and demonstrated at low frequencies.

A paper by M. M. Hoverton et al., Journal of Lightwave Technology, vol. 14. no. 3, March 1996, pag. 417–422, discloses SBS suppression using a depolarized source for high power fiber applications. A depolarized source is demonstrated using a traveling wave $LiNbO_3$ phase modulator. Resonant enhancement of the low frequency response of the modulator is obtained by using a non resonant traveling wave modulator along with a length of coaxial cable that is appropriately terminated in an open or short circuit. Thus the composite resonant cavity in this arrangement comprises the active section of the modulator and the nonactive coaxial cable.

Applicants have observed that conventional structures of the low-pass type for providing electro optical modulators do not meet the needs of current applications for optical phase modulators.

Applicants have recognized that less than optimum modulation performances are achieved in band-pass type electro-optical modulators if only the electrical resonance of the modulating signal in the electrode structure, or the power coupling between the electrical generator and the electrode structure are maximized (electrical efficiency), without regard for the electrooptical interaction.

Applicants have discovered that a more efficient modulation can be achieved by optimizing the electrooptical interaction of the modulating electrical signal with the light beam propagating in the optical waveguide structure.

Applicants have further discovered apparatus for providing an optical modulator with an electrooptical response of the band-pass type which optimizes the electrooptical interaction at a central frequency. This apparatus makes it possible to obtain the same depth of modulation at the working frequency with a lower power.

SUMMARY OF THE INVENTION

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof, as well as the appended drawings.

To achieve these and other advantages, and in accordance with the purpose of the invention as embodied and broadly described, the invention constitutes an optical modulator for operation at a selected working frequency in the range 500 MHz–3 GHz, corresponding to a wavelength $\lambda$. The modulator comprises a substrate; a waveguide formed in the substrate and having an input, an output, and an index of refraction; and a traveling wave-type electrode structure having first and second branches to establish an electrode length L. The ratio $\lambda/L$ is from about 2.1 to about 4.0. The electrode structure is formed on the substrate in relation to the waveguide to effect electro-optical variation of the index of refraction upon application to the electrode structure of a modulating signal at the working frequency. The invention also comprises an electrical conductor connecting the first and second branches to form short-circuit termination of the electrode structure.

According to a different aspect the present invention is related with an optical transmission method comprising the steps of generating an optical signal; generating a phase modulating signal at a selected frequency; modulating the phase of the optical signal according to the phase modulating signal; amplifying the phase modulated optical signal to a first optical power; transmitting the amplified optical signal along a length of optical fiber; receiving said transmitted signal.

Said first optical power has a value such that SBS would be generated in the length of optical fiber in the absence of phase modulating the signal.

The step of modulating the phase of the optical signal comprises: coupling said optical signal to a waveguide formed in a substrate having an index of refraction; coupling the phase modulating signal to a traveling wave-type electrode structure having first and second branches to establish an electrode length L comprised between 12 and 24 mm, the electrode structure being formed on the substrate in relation to the waveguide to effect electro-optical variation of the index of refraction.

The branches of the electrode structure are short-circuit terminated.

According to another aspect the invention provides an optical modulator system adapted to generate a modulating signal at a working frequency corresponding to a wavelength $\lambda$ and a modulator. The modulator has a substrate, a waveguide formed in the substrate, an input, an output, and an index of refraction. The modulator further includes a traveling wave-type electrode structure having first and second branches to establish an electrode length L and width W. The electrode structure is formed on the substrate in relation to the waveguide to effect electro-optical variation of the index of refraction upon application to the electrode structure of a modulating signal at the working frequency. The modulator also includes an electrical conductor connecting the first and second branches to form short-circuit termination of the electrode structure. $\lambda/L$ is from about 2.1 to about 4.0. A modulator system further includes an impedance matching circuit, for efficiently coupling the modulation signal from the signal generator to the modulator.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one/several embodiment(s) of the invention and, together with the description, serve to explain the principles of the invention.

BRIEF DESCRIPTION OF THE DRAWINGS

The accompanying drawings, which are incorporated in and constitute a part of this specification, illustrate embodi- In the drawings:

FIG. 1A is a plan view diagram of a prior art phase modulator with electrodes of the lumped type;

FIG. 1B is an electrical schematic diagram of an equivalent circuit of the electrode structure of FIG. 1A;

FIG. 2A is a plan view diagram of a prior art phase modulator having electrodes of the traveling wave type terminated in the characteristic impedance;

FIG. 2B is an electrical schematic diagram of an electrical equivalent circuit of the electrode structure of the modulator of FIG. 2A;

DETAILED DESCRIPTION OF THE PREFERRED EMBODIMENTS

Figure 3:
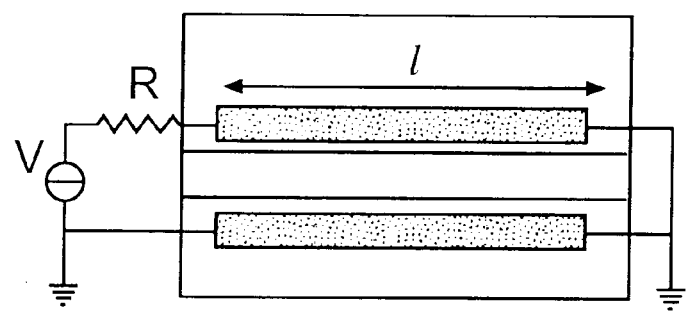
FIG. 3 is a plan view diagram of a modulator including an electrode structure constructed according to the principles of the present invention.

FIG. 3 shows a modulator constructed according to the principles of the present invention, having a traveling-wave electrode constituting a radio-frequency electric field transmission line of length L terminated with a short circuit.

In order to better understand the invention we shall compare the electrooptical response of a modulator of the traveling-wave type having a transmission line terminated in its characteristic impedance (matched line) (FIG. 2A) and terminated with a short circuit (FIG. 3).

Figure 4:
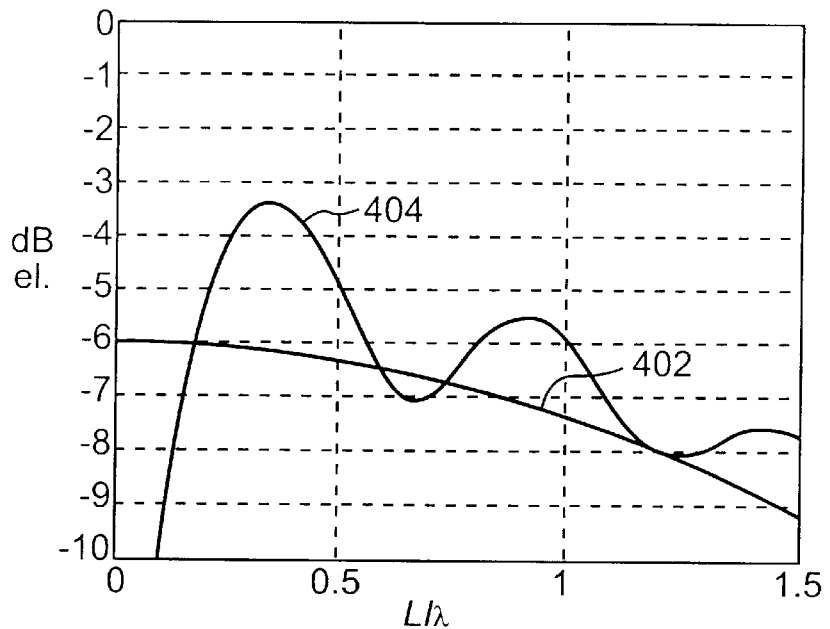
FIG. 4 is a graph of a computer simulation comparing the efficiency of modulation of the modulators of FIGS. 2A and 3.

FIG. 4 plots the simulated electrooptical response in these two cases. The value in electrical dB of the phase deviation achieved by a given electrical power is plotted against the ratio $L/\lambda$ (proportional to the modulation frequency), where $\lambda$ is the "guided" wavelength of the modulating signal, that is associated with the wavelength in vacuum $\lambda_0$ by the relation:

$$\lambda = \lambda_0/n_{eff}$$

$n_{eff}$ being the effective refractive index of the electrodes for the electrical signal. The value of $n_{eff}$ depends from the characteristics of the electrode structure and from the dielectric properties of the substrate and of the buffer layer comprised between the substrate and the electrodes, and it varies with the frequency of the modulating signal. In the frequency range of interest for optical communications $n_{eff}$ in general decreases with an increasing frequency.

In this simulation the line losses and the impedance mismatch between the voltage source and the electrodes have not been taken into account. As can be seen, the electrode terminated in its characteristic impedance has a monotonically decreasing curve 402. The slope of curve 402 depends on the propagation velocity mismatch between the optical signal and the modulating electrical signal. When the electrode is terminated with a short circuit, the response curve 404 shows a very low efficiency at low frequency and, for increasing frequencies, a peak and then an oscillating behavior, though decreasing overall.

The different behavior of the two electrode structures can be explained as follows.

Considering other parameters as constants and neglecting the phase variation of the modulating signal during interaction with the light beam (which is a good approximation, e.g., in a frequency range of 0.5–3 GHz) the modulation efficiency is proportional to the integral of the voltage (modulus and phase) along the line.

In the matched line only the progressive wave is propagated, the phase decreases linearly with the distance along the line (FIG. 5, broken line) and the voltage modulus is constant (and equal to V·R$_c$/(R+R$_c$), where V is the generator voltage and R, R$_c$, as previously defined, are the internal impedance of the generator and the characteristic impedance of the electrode structure; this value is in general smaller than V/2) so that a modulation of the optical signal is achieved.

Within the limits of low frequency the voltage along the electrode structure terminated in a short circuit is identically zero and there is no modulation of the optical signal.

When the frequency increases and the wavelength of the modulating signal becomes comparable with the dimensions of the line, the situation changes. In the short circuit line, a stationary wave produced by reflection of the incident wave from the line ends is created.

Figure 5:
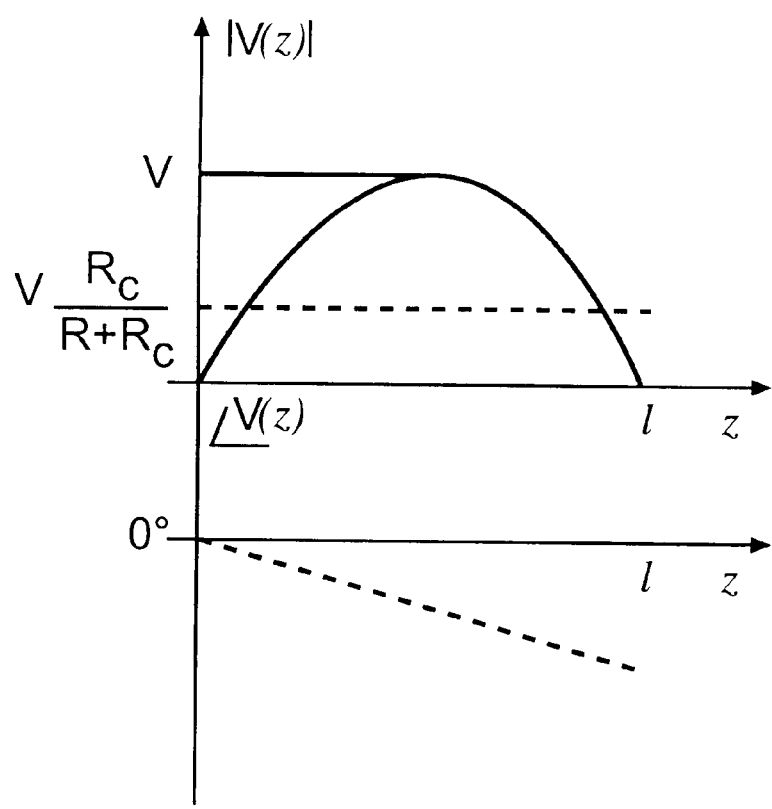
FIG. 5 is a graph of the voltage along the line in the modulus and phase for a modulator having an electrode structure in the form of a transmission line terminated in its characteristic impedance and for a similar modulator having its electrode in the form of a transmission line terminated in a short circuit.

As an example, FIG. 5 plots the modulus and the phase of the voltage along the transmission line in the case of a modulator having electrodes terminated in a short circuit (solid line), at the frequency at which the length of the line is equal to half the "guided" wavelength of the electric signal (λ/L=2).

As is evident, in the case of the line terminated in a short circuit, the voltage has a phase of 0° for the whole length of the line. The modulus of the voltage reaches a maximum of value V at the midpoint of the line and is zero at the beginning and at the end. The voltage maximum is at least two times as large as the voltage that would be present in the case of a matched line. At this frequency it is thus possible to obtain a better modulation efficiency relative to the matched case. However, the inventors have discovered that this is not the optimum efficiency modulation frequency, as will be explained in the following.

At a higher frequency a change in sign of the voltage along the line takes place. In practice, the phase modulation produced along a first portion of the line is partly canceled by the phase modulation of opposite sign produced by a second portion. This explains the first minimum in curve 404 of FIG. 4.

At a still higher frequency there is again a maximum and so on. As can be seen from curve 404, the values of the electrooptic efficiency at the various maxima decrease with increasing modulation frequency. This is due to several factors. Among them: periodical changes in the effective interaction length resulting from changes in the wavelength of the modulating signal (if the wavelength of the modulating signal is smaller than twice the electrode length, the modulation effects along different portions of the electrode partly compensate each other and only a portion of the electrode length effectively modulates the light); and the fact that the interaction between the optical and electrical fields is a distributed interaction, i.e., the phase of the electrical signal, as seen by the propagating optical signal, is not constant. For high frequencies the response of the modulator terminated in a short circuit approaches that of the matched-line modulator. A further contribution to the overall decrease in modulation efficiency for an increasing modulation frequency is expected from the line losses. This contribution, however, has not been taken into account with regard to the simulation of FIG. 4.

The inventors have observed that the integral of the voltage (in modulus and phase) is a function of not only the electrode length, but rather a function of both λ and L. For a short circuit terminated line such function is:

$$I(\lambda, L) = V_g \frac{\lambda}{2\pi} \sin^2\left(\frac{\pi L}{\lambda}\right)$$

where V$_g$ is the voltage applied by the generator.

The inventors have further observed that technological constraints, in particular the limited size of the available substrate chips, set an upper limit to the length of a modulator and limit accordingly the length of the electrodes. Even narrower constraints are present in the manufacture of cascaded modulators on the same chip.

The inventors found it advantageous to select the optimum modulation efficiency conditions under the constraint of a fixed electrode length.

For a fixed length of the electrode, the function I(λ,L) has a maximum for λ/L equal to approximately 2.7.

Accordingly the optimum modulation efficiency is not obtained at the frequency for which the ratio λ/L is 2.0.

The formula set forth above disregards the phase changes of the electrical signal during the transit time of the light therein and the electrical mismatch between the line and the voltage source. In particular, with a simplifying hypothesis, it is assumed that the maximum voltage along the line is equal to a constant V$_g$ at any frequency. This is not strictly true because, due to the mismatch of impedance between the voltage source and the electrode, the formula would be modified by multiplying V$_g$ by a factor a(f), a function of the frequency. According to Applicants' evaluation, for modulation frequencies in the range of 0.5–3 GHz, the above simplifying hypothesis holds in general to a good degree. The optimum λ/L ratio may be depart from the value of 2.7 and is generally comprised between 2.3 and 3.1. Applicant has evaluated that the modulation efficiency remains relatively high for values of λ/L comprised between 2.1 and 4.0.

As can be seen from FIG. 4, in the case of the line terminated in a short-circuit (404), the maximum modulation efficiency is obtained in the simulation for a ratio L/λ equal to approximately 0.37, which is the same as a ratio λ/L equal to approximately 2.7. As is evident from the figure, an improvement of approximately 3 dB is obtained at the working frequency relative to an electrode of the traditional traveling-wave type terminated in the characteristic impedance of the line. However, the improvement can be appreciably different in a real modulator due to effects arising from mismatch of the modulator impedance and losses due to the skin effect of the electrodes.

Figure 6:
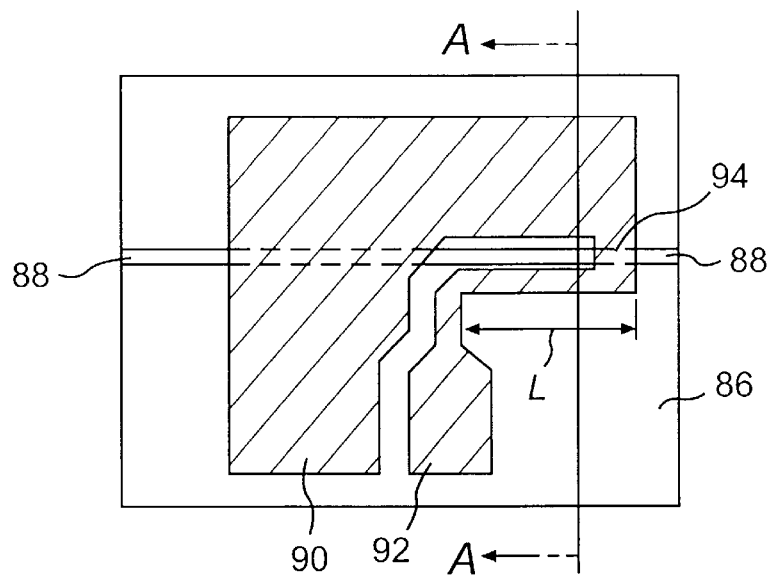
FIG. 6 is a drawing of the electrode structure of the modulator of the present invention.
Figure 7:
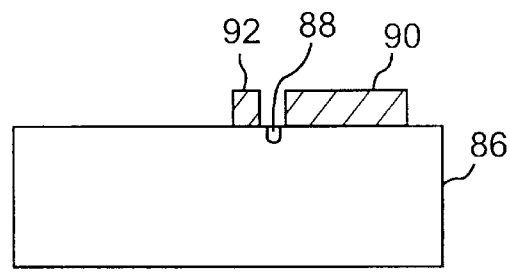
FIG. 7 is a cross sectional view of a portion of the modulator illustrated in FIG. 6.

FIGS. 6 and 7 illustrate the structure of an asymmetric coplanar strip (ACPS) phase modulator made according to the present invention. An X-cut LiNbO$_3$ substrate 86 supports a waveguide 88 and electrodes 90 and 92. In accordance with the invention, the electrodes 90 and 92 are connected together into a short circuit in the region identified as 94. The electrodes are formed so that the optical waveguide passes through the gap between then, and is thus influenced by the electrical signal applied to the electrodes.

It is possible to have either external or internal termination of the transmission line. For the test units constructed, it was determined that internal terminations with a short circuit formed directly on the chip were more beneficial, avoiding mechanical problems with external connections and heating problems on the chip.

FIG. 7 is a cross section of the modulator of FIG. 6, taken across line A—A.

Figure 8:
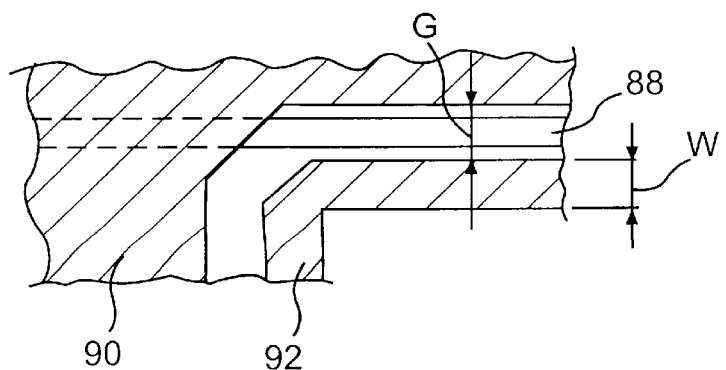
FIG. 8 is a drawing of a portion of the electrode structure shown in FIG. 6.

FIG. 8 provides an enlarged view of the region where electrodes turn from their termination pads to form the modulating element of the device. In the region where the electrodes cooperate to modulate the light signal flowing through waveguide 88, the gap between the electrodes is G, and the width of electrode 92 is W.

Applicants produced electrooptical modulators comprising a phase modulating section and an amplitude modulating section on a same LiNbO$_3$ chip. The amplitude modulating section comprised a Mach Zehnder waveguide interferometer controlled by a conventional electrode structure comprising a RF signal electrode and a DC bias electrode. The phase modulating section was made according to FIGS. 6 to 8 above (ACPS type) with a width of the signal electrode W=10 μm and a gap G=10 μm between electrodes 90 and 92. The electrode 92 was designed to be 16 mm long, in the dimension indicated by L on FIG. 6.

Applicants have made an experiment to test the phase modulation efficiency of the described modulator.

A laser diode source with an emission wavelength of 1550 nm was coupled to the input of the described modulator. No modulation was applied to the amplitude modulation section, while a variable frequency electrical generator was coupled to the phase modulation electrode structure.

It is known that by phase modulating a laser optical signal a laser linewidth is broken into several lines, spaced in frequency by the frequency of the modulating signal and of amplitude that varies with the power of the modulating signal: a line of order n has an amplitude proportional to the value of the Bessel function $J_n (\beta)$, where $\beta$ is proportional to the modulating voltage V.

The optical output of the modulator was sent to a scanning Fabry Perot filter with a free spectral range of 7.5 GHz and a finesse of 200, giving a FWHM filter bandwidth of 37.5 MHz. The output of the Fabry Perot filter was sent to a photodiode whose electrical output was coupled to an oscilloscope triggered by the same signal used to scan the Fabry Perot filter. In this way it was possible to view the amplitude of the "Bessel function" lines generated by the phase modulation. The phase modulation efficiency was taken by measuring the electrical power (i.e., the value of $\beta$) needed to null the zero order Bessel functions, i.e., the central peak ($J_0(\beta)$=0).

A theoretical simulation of the phase modulating efficiency of this modulator was performed, taking into account the losses of the electrodes, the variation of $n_{eff}$ with frequency and the impedance mismatch between the voltage source and the electrodes.

Figure 9:
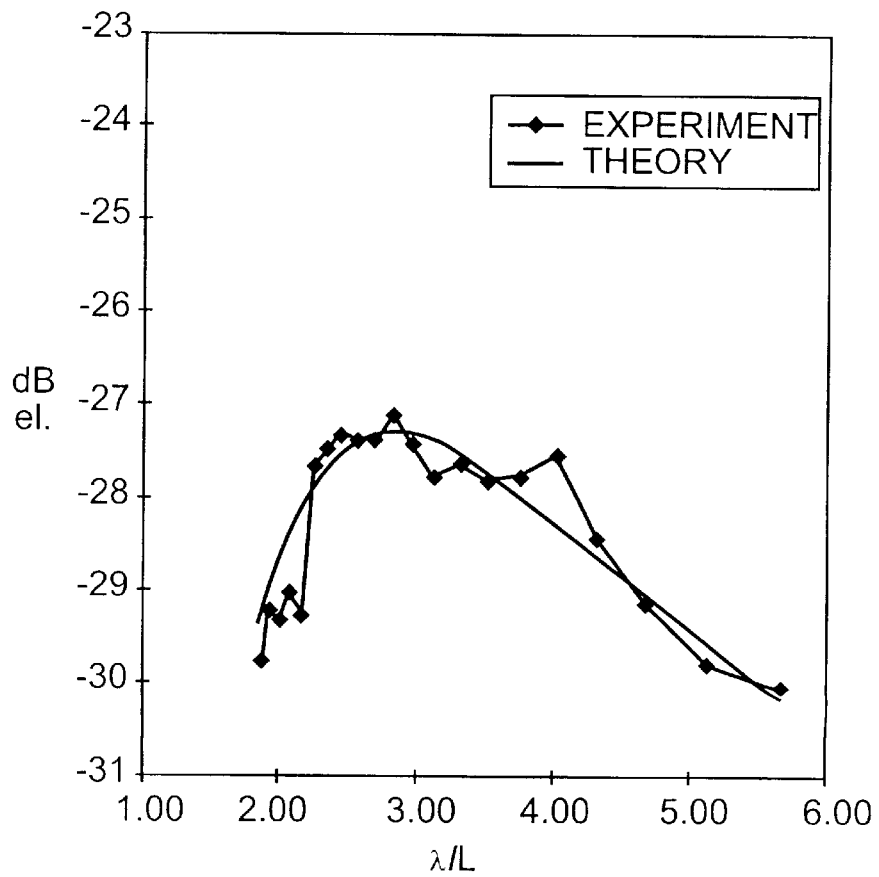
FIG. 9 is a graph showing the modulation efficiency as a function of the ratio of $\lambda/L$.

FIG. 9 shows the correspondence of theoretical and experimental data. For a value of the ratio λ/L equal to roughly 2.7 the modulation efficiency is at its peak, both theoretically and experimentally. This value corresponds to a modulating frequency of about 2.0 GHz, the value of $n_{eff}$ at this frequency being of about 3.5. Thus a modulator designed so that its λ/L ratio is at or around 2.7 will operate at peak modulation efficiency. It can also be observed that the modulation efficiency remains high for a value of the λ/L ratio comprised between 2.3 and 3.1 and still relatively high for a value of the λ/L ratio comprised between 2.1 and 4.0.

Figure 10:
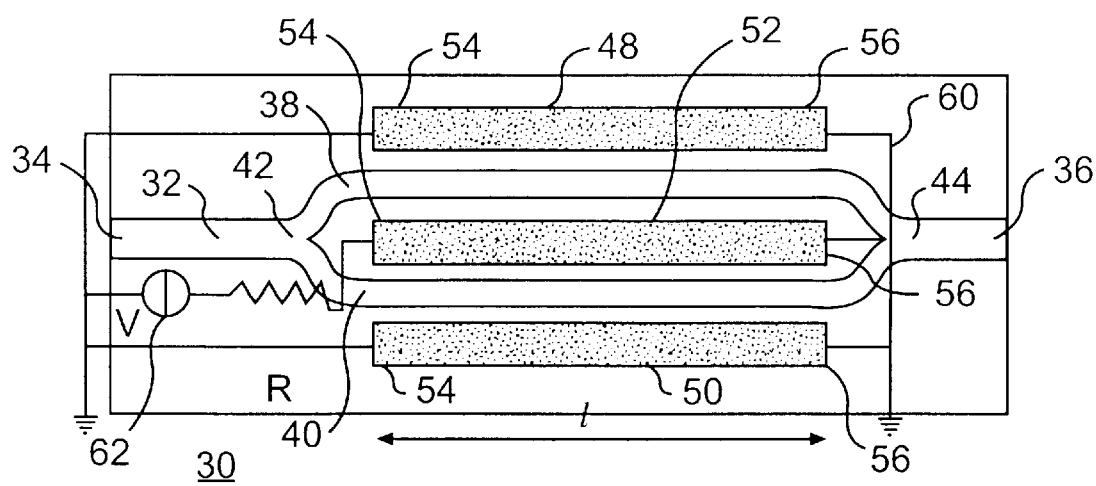
FIG. 10 is a plan view of an optical narrow-band amplitude modulator constructed according to the principles of the present invention.

An alternative embodiment of the present invention provides a narrow-band amplitude modulator. FIG. 10 shows an amplitude modulator 30 which maximizes the electrooptical response around a desired frequency. Modulator 30 includes a waveguide 32 having an input 34, an output 36, and first and second branches 38, 40. Branches 38 and 40 each have first and second ends 42, 44. First ends 42 are connected together and are also connected to waveguide input 34. Second ends 44 are connected together and are also connected to waveguide output 36.

Modulator 30 includes an electrode structure comprising first, second, and third branches 48,50,52. Third branch 52 is located between first and second waveguide branches 38 and 40. First and second electrode branches 48 and 50 are respectively located outside of waveguide branches 38 and 40. First, second, and third electrode branches 48,50,52 each have first and second ends 54 and 56. First ends 54 of first and second electrode branches 48 and 50 are electrically connected to a ground potential, and second ends 56 of the first and second electrode branches 48, 50 are electrically to a ground potential and further connected in short circuit to second end 56 of third electrode branch 52 by a conductor 60 formed on the substrate. Application of an optical signal to the waveguide input 34 and a modulating signal V to the first end 54 of the third electrode branch 52 from a voltage source 62 having an internal resistance R produces an amplitude-modulated optical signal at waveguide output 36.

Figure 11:
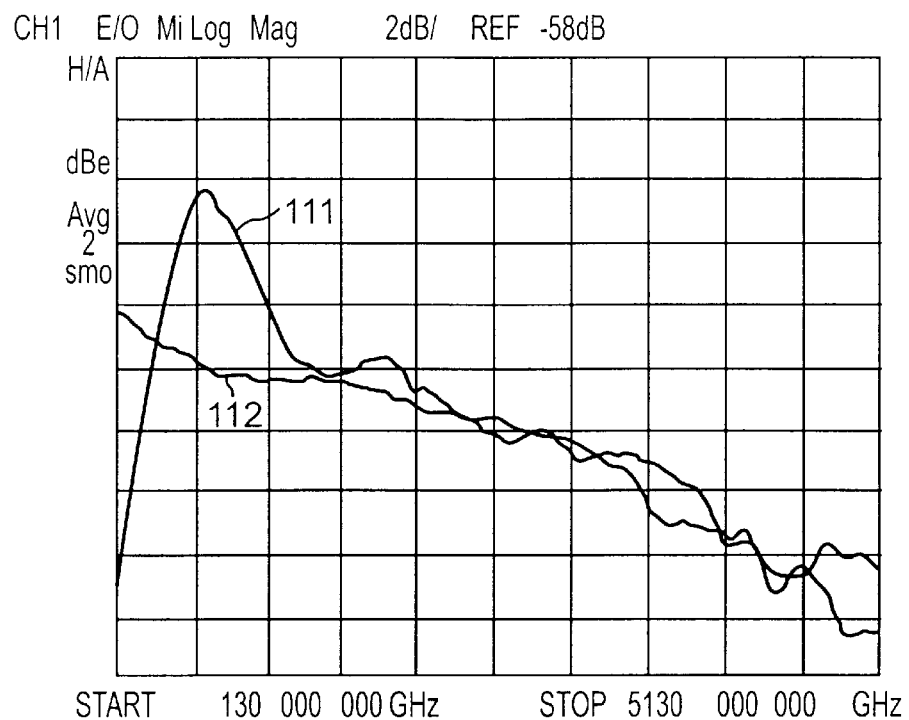
FIG. 11 is a graph of an actual test comparing the modulation efficiency of an amplitude modulator having an electrode structure in the form of a transmission line terminated in a short circuit (of the type shown in FIG. 10) with an amplitude modulator having an electrode structure terminated in its characteristic impedance.

In a tested embodiment, the electrode length L was 32 mm. An optical signal at a wavelength of about 1550 nm was input into the modulator. A modulating electrical signal was coupled to the electrode structure and its frequency swept from about 130 MHz to about 5.130 GHz. The modulation efficiency curve of this embodiment is plotted in FIG. 11 (curve 111). As shown therein, the frequency at which a maximum of electrooptical efficiency is obtained is in the vicinity of 730 MHz. The value of the refractive index $n_{eff}$ for the described modulator at a frequency around the peak efficiency frequency is of about 3.7. The value of the λ/L ratio at the peak efficiency frequency is of about 3.5.

Figure 12:
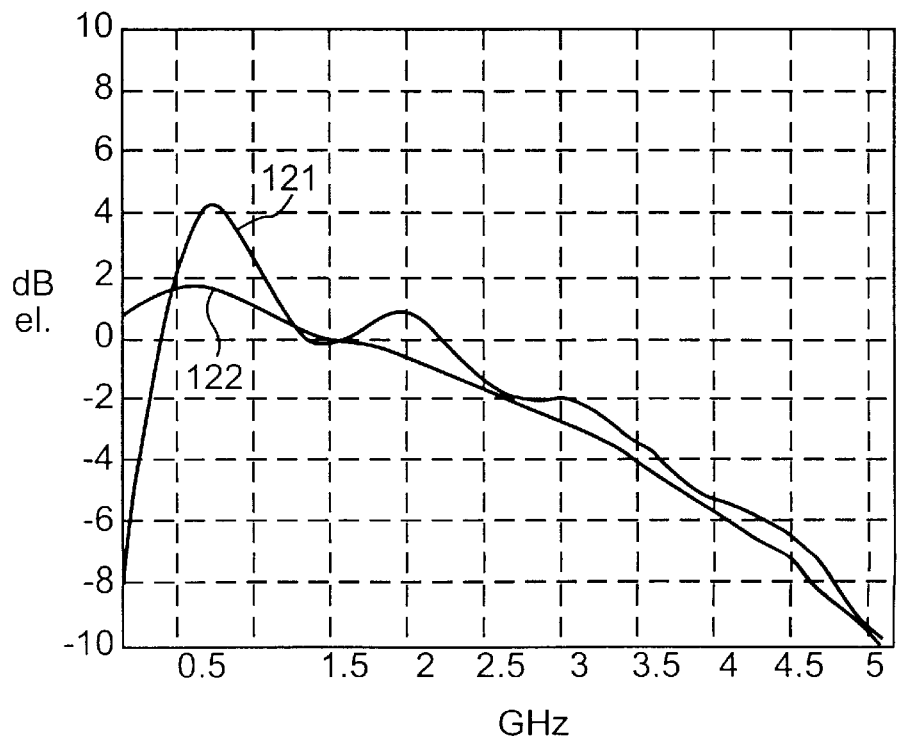
FIG. 12 is a graph of a computer simulation of the above test.

A theoretical simulation of the behavior of this embodiment was performed, taking into account the losses of the electrodes, the variation of $n_{eff}$ with frequency and the impedance mismatch between the generator and the electrodes. The results of this simulation are shown in FIG. 12 (curve 121). Good agreement was obtained with the experimental results. For comparison, FIG. 11 and FIG. 12 have a curve with experimental results (112) and a curve with a theoretical simulation (122) relating to an otherwise equal amplitude modulator but terminated in its characteristic impedance.

The increase in electrooptic modulation efficiency of the phase section of the constructed modulators was confirmed by measurement by Applicants of SBS suppression efficiency in an optical communication system.

Figure 13:
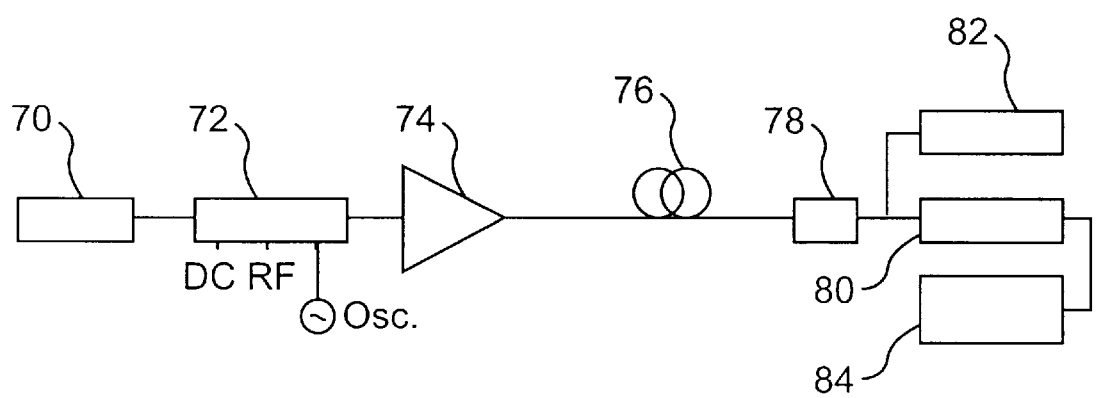
FIG. 13 is a schematic of the test apparatus used to evaluate the efficiency of the phase modulation of the circuits tested.

An optical communication system as made and tested by Applicants is illustrated in FIG. 13. Specifically, a semiconductor laser 70 was used to supply an optical signal at a wavelength of 1550 nm into a amplitude/phase modulator 72 of the above described type.

The modulated signal was amplified to a power of 16 dBm by an erbium doped fiber amplifier (EDFA) 74 operating in a saturated regime and then supplied to an optical transmission line 76 made with a length of 50 km of single mode optical fiber. The optical signal from the fiber line was supplied to an attenuator 78 and then to a photodiode detector 80. The attenuator 78 was controlled such that all measurements were made with a constant optical power at the detector 80, measured via a power meter 82. The RF signal from the photodiode detector 80 was supplied to an electrical spectrum analyzer 84 for analysis.

A first measurement was made of the noise at the receiver with an optical power of 16 dBm at the fiber input and without phase modulation.

The noise power at a frequency of interest was measured via the electrical spectrum analyzer (the chosen frequency was 200 MHz). A phase modulating signal was then applied to the phase modulating electrode of the optical modulator with a frequency that varied in steps of 200 MHz from 400 to 2400 MHz. The electrical power at the oscillator output was kept at 26 dBm.

Noise at a frequency of 200 MHz was measured at each frequency step, while keeping optical power at the receiver constant. The difference (in dB) between the noise value at 200 MHz without and with the modulating signal represents a significant measurement of the Brillouin scattering suppression.

Figure 14:
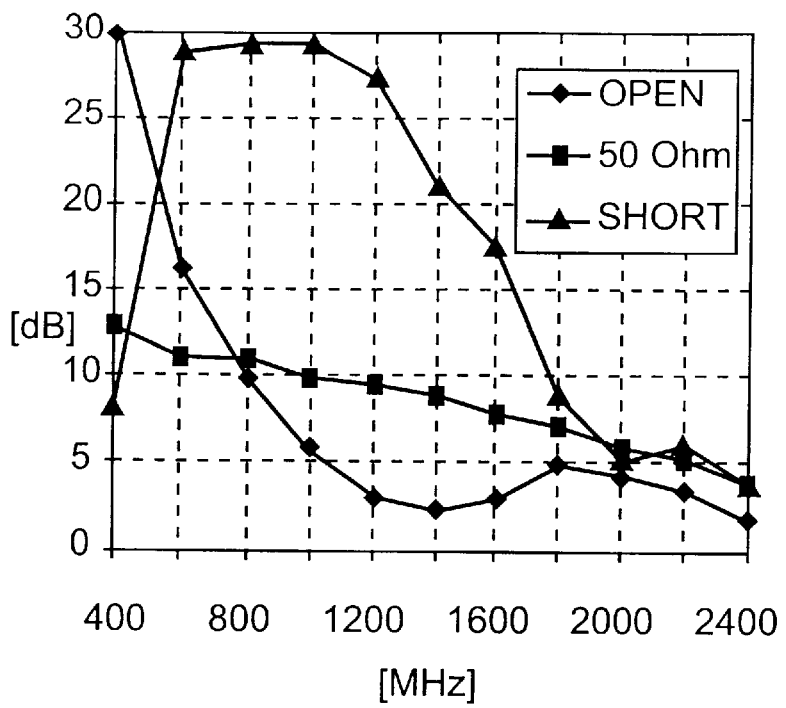
FIG. 14 is a graph of an actual test comparing a suppression of Brillouin scattering as a function of frequency for modulators having various types of electrode termination, and having an electrode length of 25 mm.

FIG. 14 plots the level of suppression of Brillouin scattering as a function of the frequency of the modulation signal, for a short circuit terminated modulator and, for comparison purposes, for modulators of the same type but having an electrode terminated with 50 Ohms and terminated with an open circuit. It can be seen that an improvement in suppression of almost 20 dB is obtained at 1 GHz with the modulator having the shorted electrode, compared to the 50 Ohms terminated. Since the relation between the suppression of Brillouin scattering and phase modulation efficiency is a nonlinear function, it is difficult to determine precisely by this measurement the degree of improvement in efficiency. However, better SBS suppression reliably indicates a better efficiency of phase modulation.

FIG. 14 also shows that the suppression maximum is obtained around a frequency of 1 GHz. The electrode of the modulator used for the test to which FIG. 14 refers has a length L of 25 mm. The value of the ratio $\lambda/L$ is in this case of about 3.3.

Figure 15:
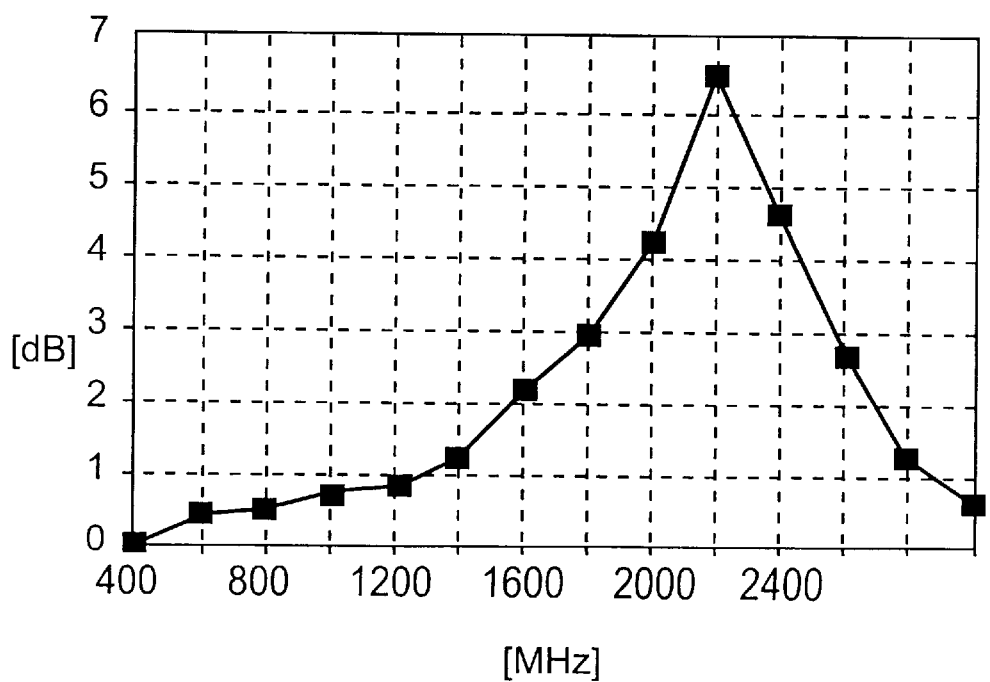
FIG. 15 is a graph showing the suppression of Brillouin scattering as a function of frequency for a modulator having an electrode terminated in a short circuit and an input impedance matching network, with an electrode length of 15 mm.

FIG. 15 shows the curve of Brillouin suppression vs. frequency for a phase modulator having an electrode 15 mm in length terminated in short circuit. In this case, a conventional impedance matching network has been connected between the modulating signal source and the electrode structure of the modulator. The efficiency peak falls around 2.2 GHz. For this structure, the optimum efficiency value of the ratio $\lambda/L$ is about 2.6.

Complete suppression of SBS scattering was achieved at the modulating frequency of 2.1 GHz with an electrical power of 2 W.

In a comparative experiment, complete SBS suppression required an electrical power of about 8 W in a setup identical to the previous one, but for the modulator having an impedance matched terminated electrode structure instead of a short circuit termination.

As those of ordinary skill in the art will understand, the present invention is not limited to a preferred crystallographic cut of the substrate, but will function equally well on X or Z cuts. The only difference will be the physical location of the electrodes on the crystal, in order to align the field lines from the electrodes with the optical axis (c-axis) of the crystal which has the maximum electrooptic efficiency.

The present invention provides a narrow-band electrooptical phase modulator in which the electrooptical interaction is optimized relative to the working frequency suitable for phase modulation for optical CATV systems (in the vicinity of 2.0 GHz). This modulator optimizes the electrooptical interaction and makes it possible to reduce the electric piloting power (the depth of modulation being equal) from 8 watts to 2 watts.

Figures 16A, 16B:
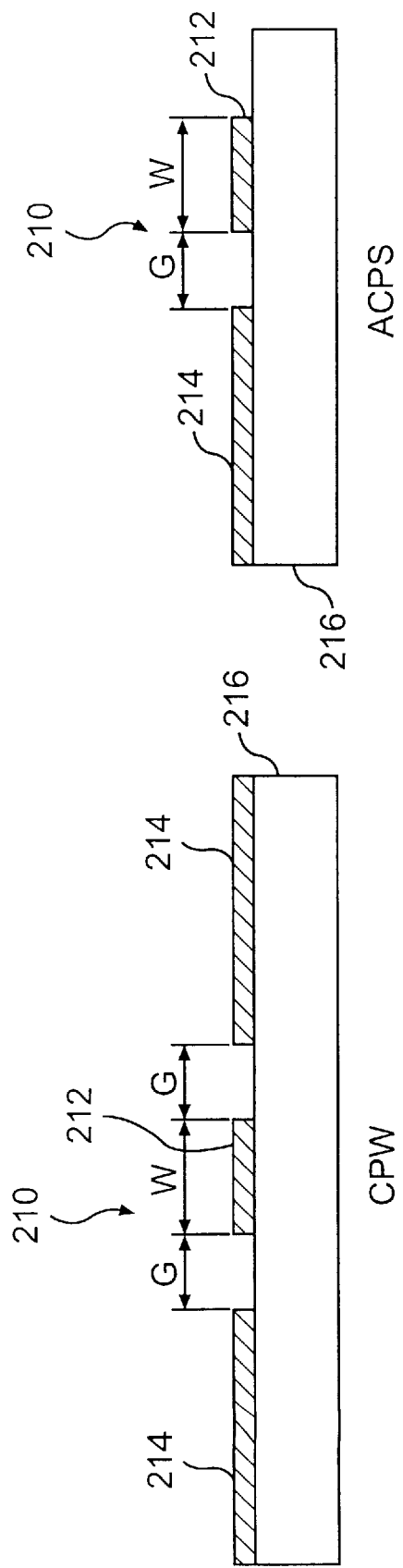
FIGS. 16a and 16b respectively show a cross section of an optical modulator with a coplanar strip waveguide (CPW) electrode and an optical modulator with an asymmetric coplanar strip (ACPS) electrode.

The most common types of electrode structures used in transmission lines on lithium niobate (LiNbO$_3$) are the co-planar waveguide (CPW) and the asymmetric co-planar strip (ACPS). The two types of structures are illustrated in FIGS. 16a and 16b. In each case, a modulator 210 includes electrodes 212 and 214 formed on a substrate 216. The width of active electrode 212 is W and the spacing, or gap, between active electrode 212 and electrode 214 is G.

Applicants have evaluated that the two structure types present similar effective refractive indexes for the electrical modulating signal, within less than 10%. Therefore, the wavelength of the electrical signal that is propagated in the two structures for equal frequencies will be comparable. This means that once the working frequency is selected, the required length of both CPW and ACPS electrode structures will be practically equivalent. For example, to provide a maximum electro-optical efficiency around the frequency of 2 GHz, with an effective refractive index around 3.5, a wavelength $\lambda$ equal to the following is obtained:

$$\lambda = \frac{\lambda_0}{n_{eff}} = \frac{c}{n_{eff} f} = 4.3 \text{ cm}$$

As previously set forth, the most effective electrode structure is defined by the relationship $\lambda/L$ equal to 2.7. Applying this relationship to the above identified 4.3 cm $\lambda$, and dividing by 2.7, it is shown that the suggested electrode length is 16 mm in the above example.

However, the total electro-optical efficiency of a modulator is dependent not only on the interaction between the electric signal and the optical signal, but also on the mode by which the structure of the modulator is coupled to the generator.

The efficiency of coupling between modulator and generator is governed by the reflection coefficient r defined as follows, where $Z_g$ is the impedance of the generator (usually 50 Ω) and Z is the input impedance of the modulator:

$$r = \frac{Z - Z_g}{Z + Z_g}$$

Figure 17:
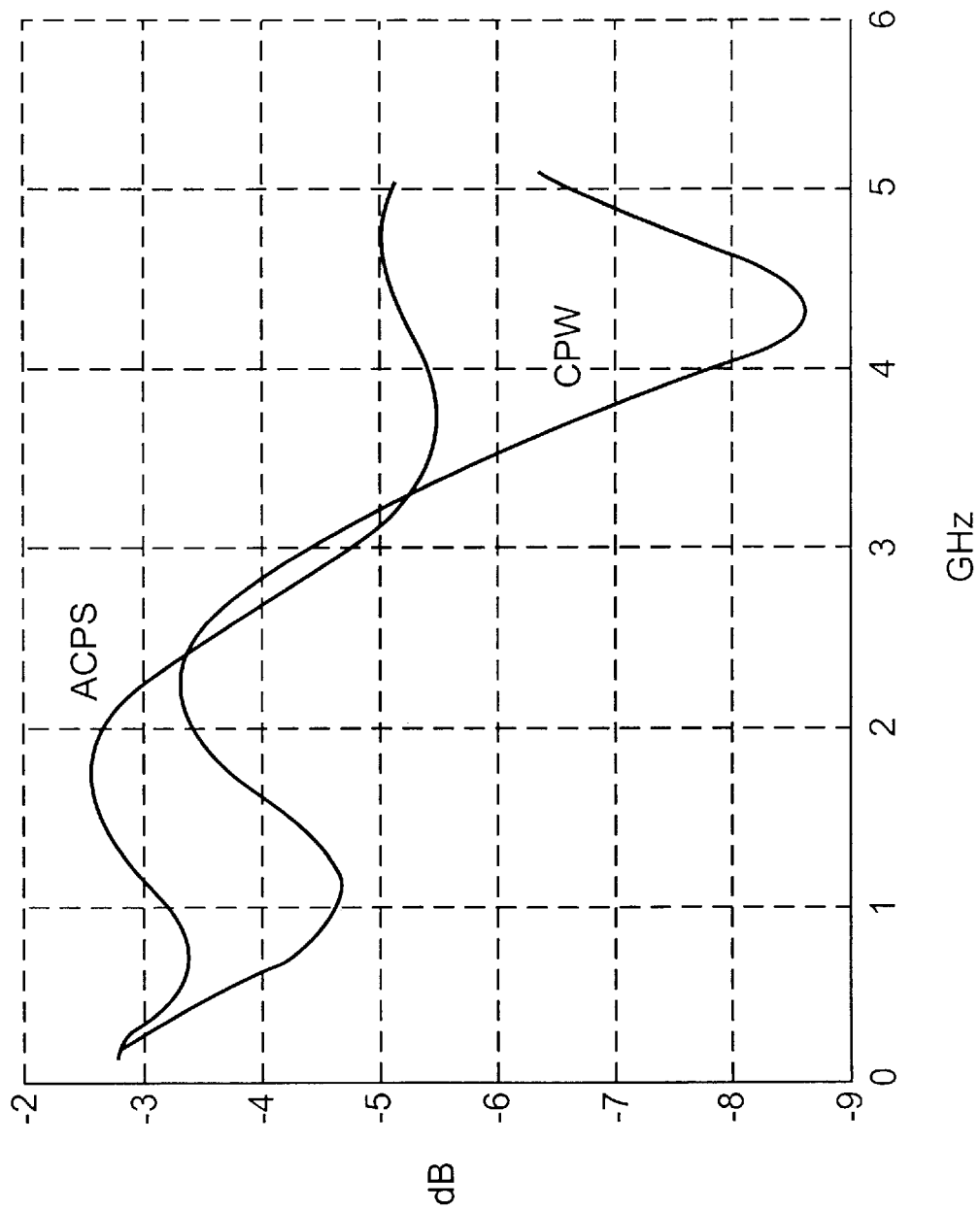
FIG. 17 shows a graph of the modulus of the reflection coefficient for an ACPS line and a CPW.

With respect to the reflection coefficient r, the CPW and ACPS electrode structures are not equivalent. FIG. 17 shows the difference between the modulus (expressed in dB) of the reflection coefficient of a CPW structure and of an ACPS.

The results of FIG. 17 refer to CPW and ACPS electrode structures (FIGS. 16a and 16b) with width W=10 μm and gap G=10 μm. It is not evident that this difference in the reflection coefficient is reflected in the modulation efficiency. By a simulation, however, Applicants have evaluated, from knowledge of the characteristic parameters of the two electrode structures as a function of frequency (i.e., characteristic impedance and effective refractive index), the variation of the voltage along the line of interaction, and have thus evaluated the electro-optical efficiency of the structures.

Figure 18:
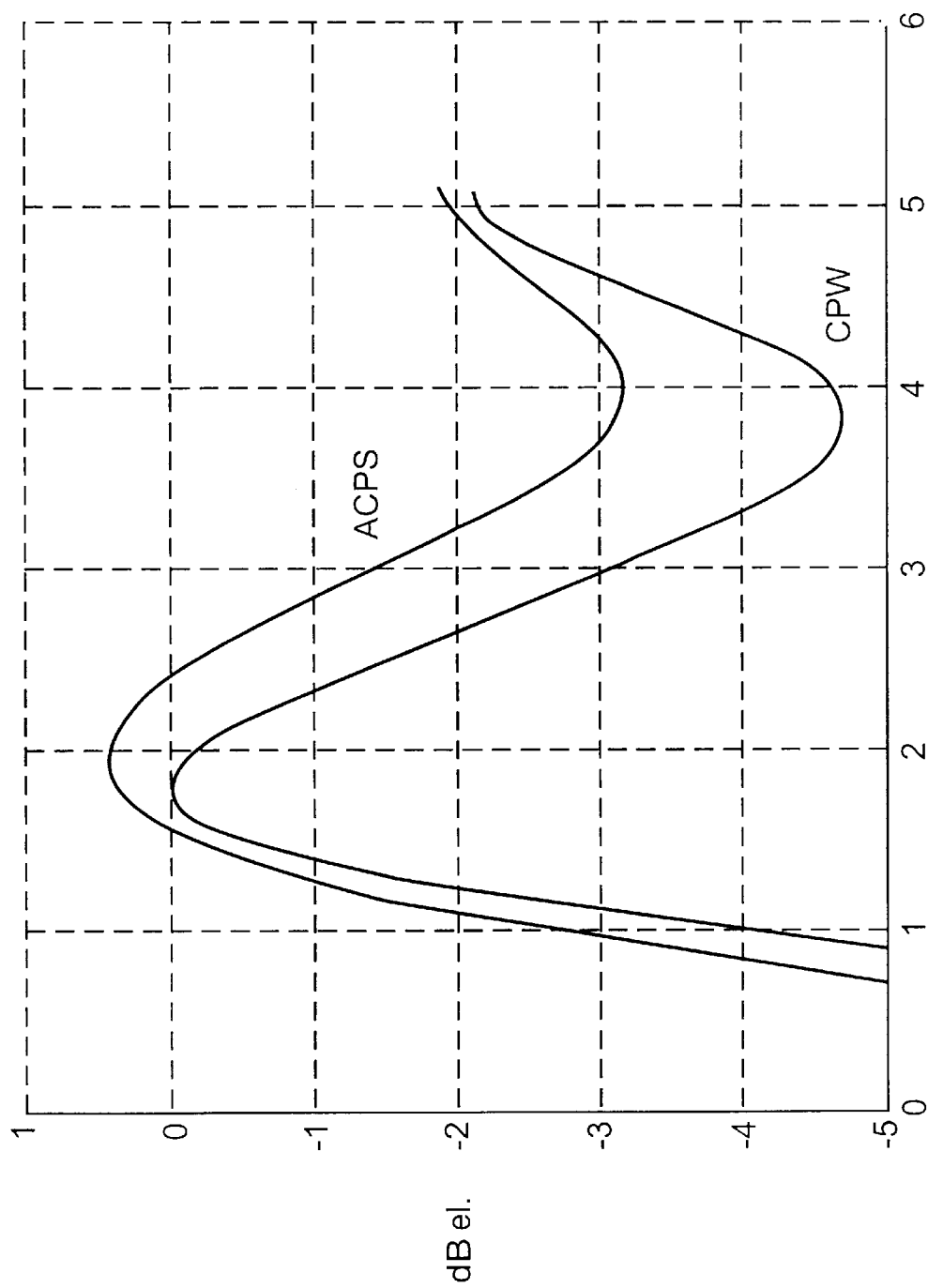
FIG. 18 shows a comparison of modulation efficiency for an optical modulator with a CPW electrode and an optical modulator with an ACPS electrode.

FIG. 18 compares the modulation efficiency of optical modulators having CPW and ACPS electrode structures. As is evident from the FIG. 18, the ACPS structure presents a modulation efficiency that is always greater than that of CPW, specifically, about 0.5 dB greater than that of the CPW structure, with the maximum efficiency located at around 2 GHz.

Figure 22:
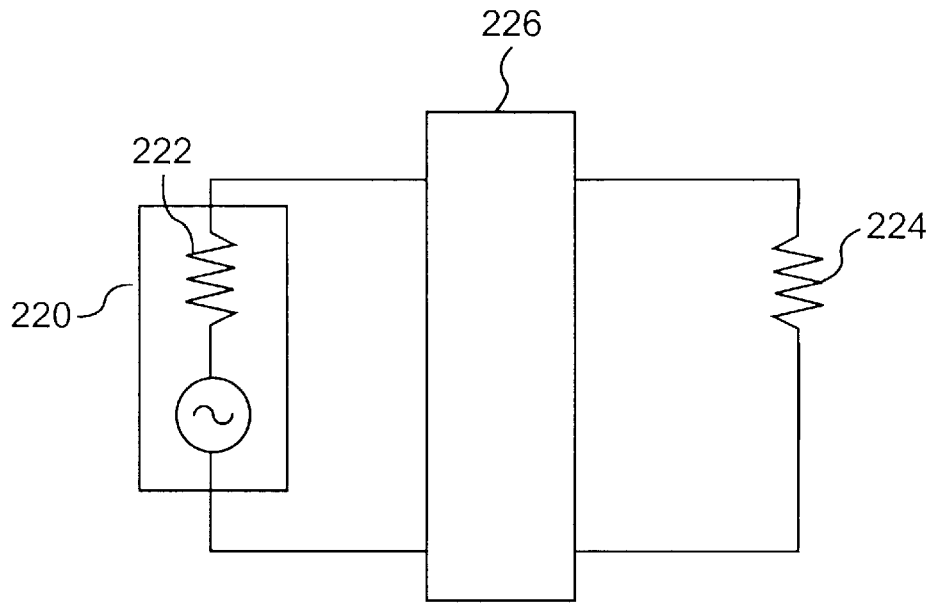
FIG. 22 shows a block diagram of a modulator and generator coupled by a suitable impedance matching network.

Since both CPW and ACPS electrode structures are terminated in a short-circuit and since line losses are relatively low, the modulator input impedance is always very different from an optimal impedance match with the generator, as demonstrated by the reflection coefficient (FIG. 17). The power of the generator is practically totally reflected. To improve the overall performance of the modulator plus generator system, a passive impedance matching network can be interposed between the generator and the modulator. This passive network will, at the working frequency (e.g., 2 GHz), optimize the energy transfer between generator and modulator, making it possible to utilize all the available power of the generator. FIG. 22 shows a block diagram of a modulator and generator coupled by a suitable impedance matching network. This may be a standard impedance matching network as is well known in the art. For example, FIG. 22 shows the modulation signal source 220 coupled through its internal characteristic impedance 222 (usually 50 Ohm) to passive impedance matching network 226. Also coupled to impedance matching network 226 is the modulator of the present invention, represented by its impedance 224.

Figure 19:
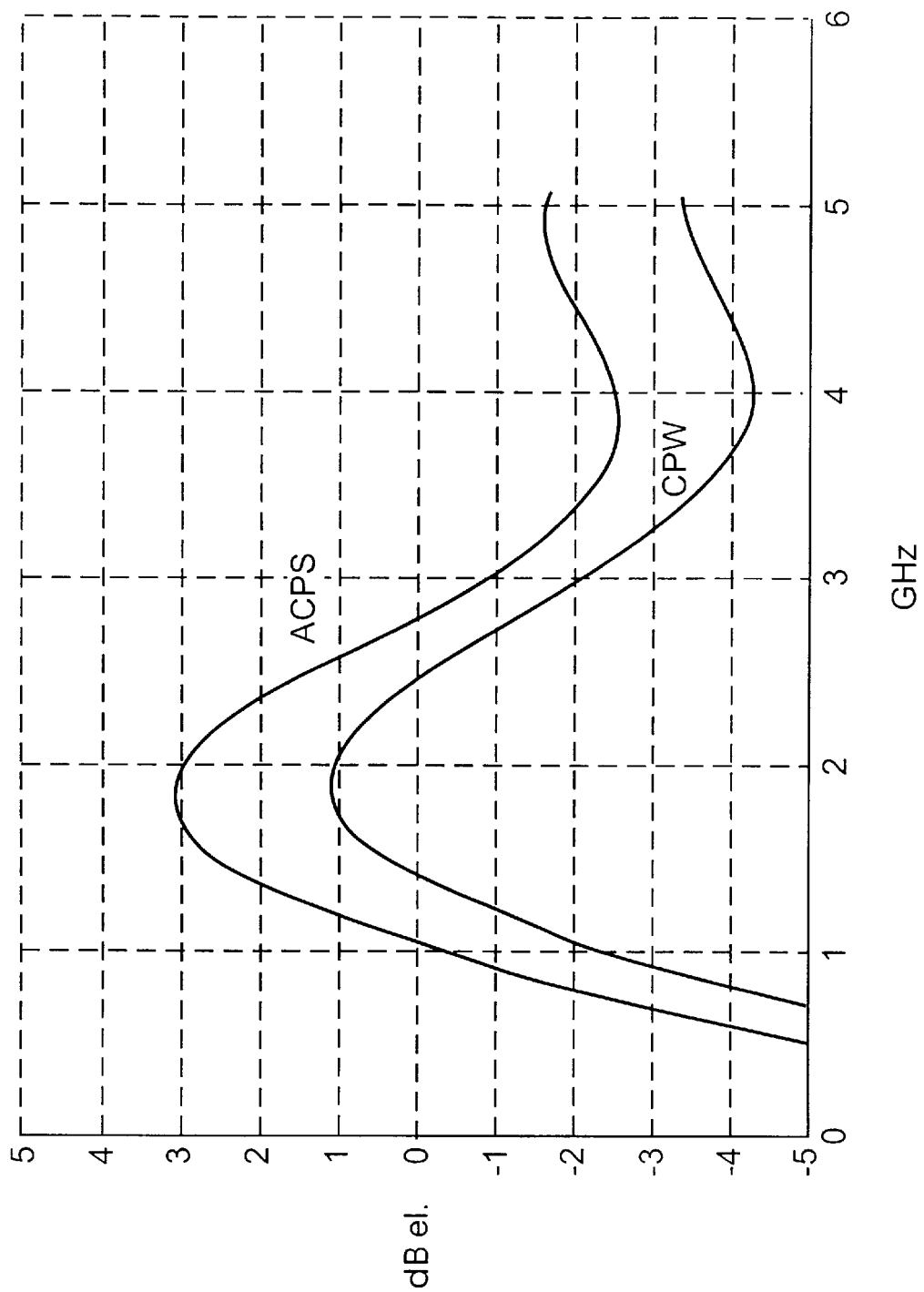
FIG. 19 shows a comparison of modulation efficiency for an optical modulator with a CPW electrode and an optical modulator with an ACPS electrode, where the input impedance of the modulator is matched to the generator impedance.

The modulation efficiency for the two types of electrode structures, assuming use of an impedance matching network to achieve a perfect match, is shown in FIG. 19.

As can be seen in FIG. 19, the ACPS structure is preferred over the CPW structure in this case also. The difference in modulation efficiency between the two structures at the optimal frequency is increased to 2 dB. In addition, it is evident in comparing the absolute values of FIGS. 18 and 19 that impedance matching improves the efficiency in the case of the ACPS structure by more than 2 dB.

Applicants have found that, in designing an optimal structure of the phase modulator, the width of the signal electrode is a fundamental parameter. In this case also, it is necessary to distinguish between the case in which the modulator is coupled to the generator directly and the case in which an impedance matching circuit is interposed.

Figure 20:
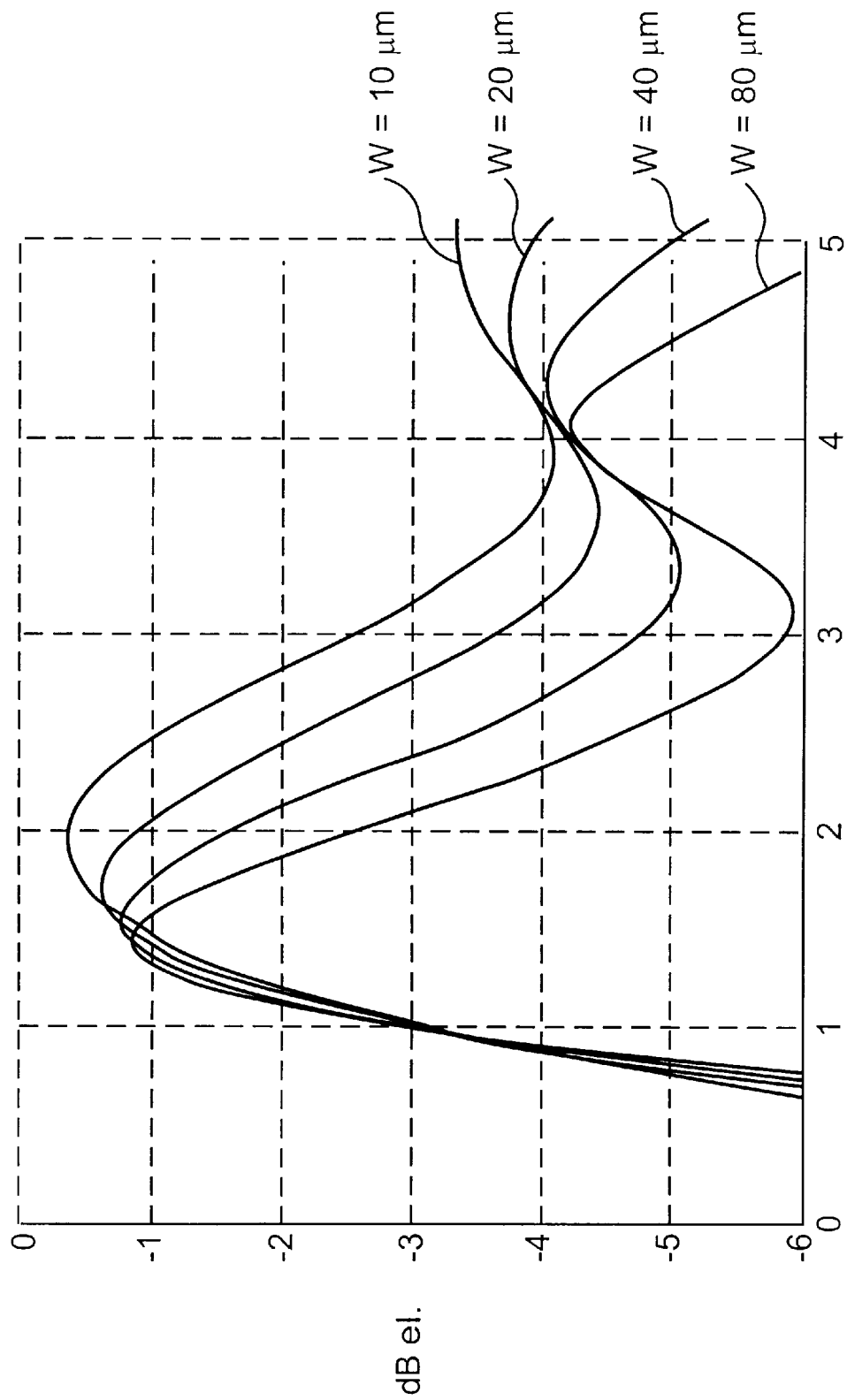
FIG. 20 shows a graph of modulation efficiency for an ACPS structure as a function of width, where the impedance of the modulator is not matched to the impedance of the generator.

FIG. 20 shows the modulation efficiency as a function of frequency for various electrode widths W, without an impedance matching circuit. This figure demonstrates that, without an impedance matching circuit between generator and modulator, the structure with a small W (10 $\mu$m) is the best, for two reasons. First, as W decreases, the frequency of optimal efficiency is shifted upward, the electrode length being equal (FIG. 20 refers to modulators 16 mm in length). Second, the electrode with the minimum width also presents a flatter frequency response.

Figure 21:
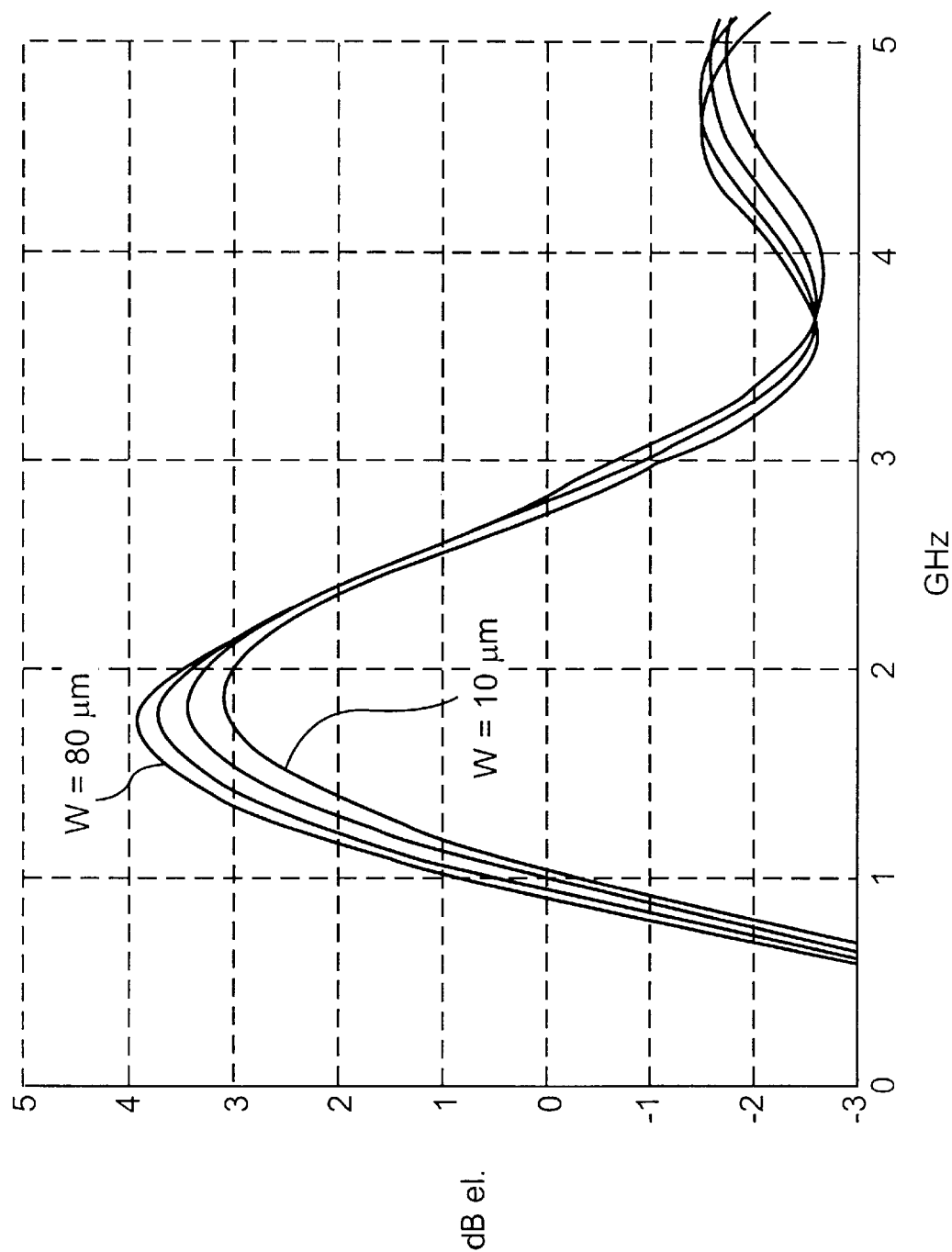
FIG. 21 shows a graph similar to FIG. 20, where the impedance of the modulator is matched to the impedance of the generator.

The situation is considerably different when the modulator impedance is matched to the generator. FIG. 21 plots the modulation efficiency as the width of the signal electrode is varied for an ACPS structure impedance matched to the generator.

In this case, although it is still true that with an increase in electrode width, the maximum efficiency is obtained for lower frequencies, the structure with the wider electrode is always more efficient than the structure with the narrow electrode in the vicinity of the resonance frequency, although by fractions of a dB. Although the structures are practically equivalent with regard to modulation efficiency, the structure with the wide electrode is preferred for reasons of reliability. This flows from the heating discussion contained in the Background of the Invention. Let us assume that the power dissipated by two modulators of identical design, except for their electrode width W, is identical. Because the electrode with the larger W has a larger surface area, it will dissipate heat more quickly, and thus in a given unit of time will dissipate more heat. This results in the modulator operating at a cooler temperature, and thus having a higher reliability due to less likelihood of heat-induced failure.

Thermal simulations were conducted to evaluate the heat dissipation of the various electrode widths for a modulator with an ACPS structure. Table I gives the results of these simulations, which refer to a dissipated power of 4.5 W. The table clearly shows how the maximum temperature attained by the filament drops by about 50° C. when the electrode width increases 10 $\mu$m to 80 $\mu$m.

TABLE I

| W ($\mu$m) | T (° C.) |
|---|---|
| 10 | 200 |
| 20 | 169 |
| 40 | 157 |
| 80 | 145 |

It can therefore be appreciated that in the absence of an impedance matching circuit between generator and modulator, the optimal structure is the ACPS with an electrode width of 10 $\mu$m. However, when the modulator impedance is matched to the generator, the optimal structure is an ACPS with a width of the signal electrode of 80 $\mu$m or more. In an ACPS modulator as previously described with reference to FIG. 6 to FIG. 8, a width W of the signal electrode 92 of 80 $\mu$m presents a better reliability due to a greater efficiency in thermal dissipation in both the electrode and the substrate underneath the electrode; an improved modulation efficiency is also provided.

Figure 23:
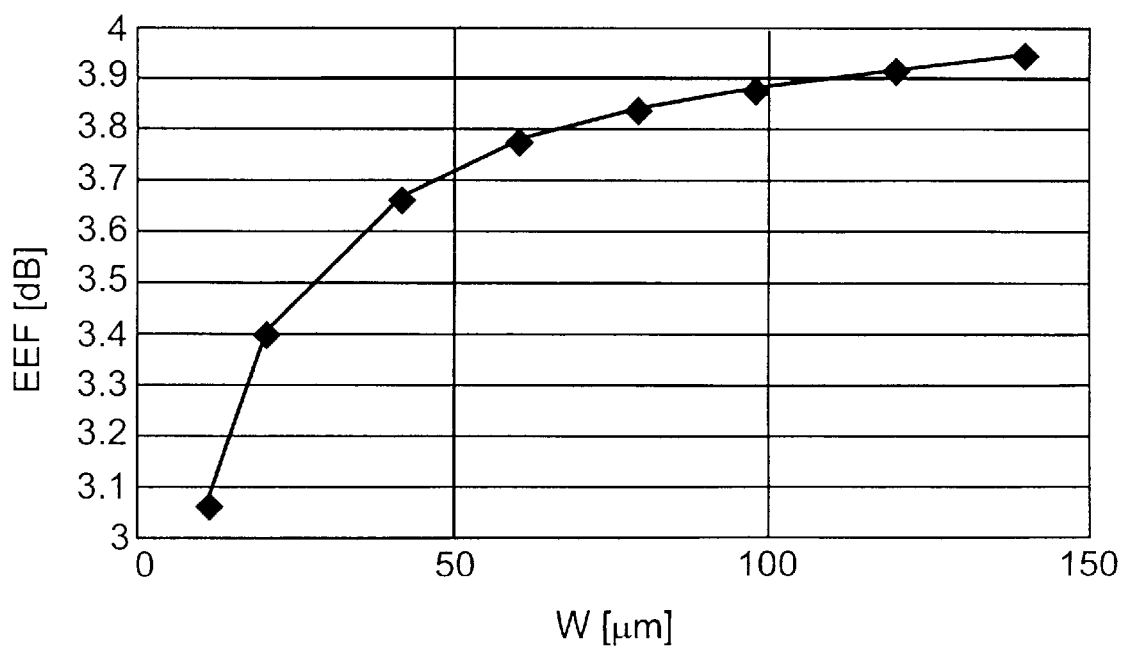
FIG. 23 shows how the modulation efficiency of a modulator according to the present invention varies depending upon the width W of the active electrode.

Finally, FIG. 23 presents the results of a simulated study of electrode width W and modulation efficiency in dB. As can be seen from FIG. 23, the efficiency increased from approximately 3.05 dB at 10 $\mu$m width to 3.94 dB at 150 $\mu$m width, with most of the improvement occurring between 10 $\mu$m and 120 $\mu$m.

It is estimated that an electrode width W of between 15 and 200 $\mu$m acts to provide both improved modulation efficiency and reduced thermal stress to the modulator circuit.

Preferably, the width W is comprised between 40 and 160 $\mu$m. Even more preferably, the width W is comprised between 60 and 120 $\mu$m.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical modulator for operation at a selected working frequency in the range 500 MHZ–3 GHz, corresponding to a wavelength $\lambda$, the modulator comprising:

a substrate;

a waveguide formed in the substrate and having an input, an output, and an index of refraction; and a traveling wave-type electrode structure having first and second branches to establish an electrode length L, the ratio $\mu$/L having a value between 2.1 and 4.0 and the electrode structure being formed on the structure in relation to the waveguide to effect electro-optical variation of the index of refraction upon application to the electrode structure of a modulating signal at the working frequency;

the modulator comprising an electrical conductor connecting the first and second branches of said electrode structure to form short-circuit termination of the electrode structure.

2. An optical modulator as recited in claim 1, wherein the first and second branches are disposed on opposite sides of the waveguide such that application of a modulating signal produces a phase modulated optical signal at the output of the waveguide.

3. An optical modulator as recited in claim 1, wherein the waveguide comprises first and second branches each having first and second ends, the first ends being coupled together and also being coupled to the waveguide input, and the second ends being coupled together and also being coupled to the waveguide output;

the electrode structure further comprising a third branch opposite said second branch with respect to said first branch; and the electrode first, second, and third branches each having first and second ends, the first ends of the electrode first and second branches being connected together, and the conductor connecting the second ends of the first, second, and third electrode branches, whereby application of a modulating signal to the first end of the first electrode branch produces an amplitude modulated optical signal at the waveguide output.

4. An optical modulator as recited in claim 1, wherein the first and second branches have a length between about 12 and 24 mm, and the working frequency has a value of about 2.0 GHz.

5. An optical modulator as recited in claim 1, wherein the first electrode branch has a width W between 15 and 200 $\mu$m.

6. An optical modulator as recited in claim 5, wherein the width W is between 40 and 160 $\mu$m.

7. An optical modulator as recited in claim 6, wherein the width W is between 60 and 120 $\mu$m.

8. An optical modulator system including a generator adapted to generate a modulating signal at a working frequency corresponding to a wavelength $\lambda$ and a modulator, the modulator comprising:

a substrate;

a waveguide formed in the substrate and having an input, an output, and an index of refraction;

a traveling wave-type electrode structure having first and second branches to establish an electrode length L, the ratio $\lambda/L$ having a value between 2.1 and 4.0 and the electrode structure being formed on the substrate in relation to the waveguide to effect electro-optical variation of the index of refraction upon application to the electrode structure of a modulating signal at the working frequency;

the modulator comprising an electrical conductor connecting to the first and second branches of said electrode structure to form short-circuit termination of the electrode structure.

9. An optical modulator system as recited in claim 8, wherein the ratio $\lambda/L$ has a value between 2.3 to 3.1.

10. An optical modulator system as recited in claim 8, further comprising an impedance matching circuit, for efficiently coupling the modulation signal from the signal generator to the modulator.

11. An optical transmission method comprising the following steps:

generating an optical signal;

generating a phase modulating signal at a selected frequency in the range 500 MHZ–3 GHz;

modulating the phase of the optical signal according to the phase modulating signal;

amplifying the phase modulated optical signal to an optical power higher than 6 dBm;

transmitting the amplified optical signal along a length of optical fiber;

receiving said transmitted signal;

said step of modulating the phase of the optical signal comprising:

coupling said optical signal to a waveguide formed in a substrate having cn index of refraction;

coupling the phase modulating signal to a traveling wave-type electrode structure having first and second branches to establish an electrode length L, the electrode structure being formed on the substrate in relation to the waveguide to effect electro-optical variation of the index of refraction;

said electrode length L comprising between 12 and 24 mm and said branches of said electrode structure being short circuit terminated.

\* \* \* \* \*